United States Patent [19]
Aoki et al.

[11] Patent Number: 4,865,379
[45] Date of Patent: Sep. 12, 1989

[54] AUTOMOTIVE SEAT WITH HEATING DEVICE

[75] Inventors: Akira Aoki; Kunihiko Itoh, both of Akishima, Japan

[73] Assignee: Tachi-S Co., Ltd., Tokyo, Japan

[21] Appl. No.: 153,508

[22] Filed: Feb. 4, 1988

[51] Int. Cl.⁴ .............................................. A47C 7/74
[52] U.S. Cl. ......................................... 297/180; 5/421; 297/192; 297/452; 297/DIG. 1
[58] Field of Search ......... 297/180, 192, 452, DIG. 1; 5/421, 422

[56] References Cited

U.S. PATENT DOCUMENTS

| | | | |
|---|---|---|---|
| 3,154,345 | 10/1964 | Lambrecht | 297/452 X |
| 3,736,022 | 5/1973 | Radke | 5/468 X |
| 3,738,702 | 6/1973 | Jacobs | 297/180 |
| 4,558,905 | 12/1985 | Natori | |
| 4,571,763 | 2/1986 | Suzuyama et al. | 297/DIG. 1 X |
| 4,699,427 | 10/1987 | Kobayashi | 297/DIG. 1 X |

FOREIGN PATENT DOCUMENTS

| | | | |
|---|---|---|---|
| 1548911 | 10/1968 | France | 297/452 |
| 83051003 | 1/1984 | Sweden . | |
| 84003870 | 7/1986 | Sweden . | |
| 2064954 | 6/1981 | United Kingdom | 297/180 |
| 84/01885 | 5/1984 | World Int. Prop. O. | 297/180 |

*Primary Examiner*—Peter R. Brown
*Attorney, Agent, or Firm*—Browdy and Neimark

[57] ABSTRACT

An automotive seat with a heating device provided therein, in which a trim cover assembly is integrally affixed over a foam cushion member, comprises a recessed portion formed at the rear of the cushion member, a block member removably inserted in the recessed portion, and a heating device secured on the block member. With such structure, the heating device is embedded in the cushion member such that it is interposed between those recessed portion and block member. Both cushion and block members are further supported on a frame and support member provided in the seat.

6 Claims, 2 Drawing Sheets

AUTOMOTIVE SEAT WITH HEATING DEVICE

BACKGROUND OF THE INVENTION

1. Field of the Invention

The present invention relates to an automotive seat having a built-in heating device equipped therein, and particularly relates to an automotive seat of this sort so designed to avoid an unpleasing seating touch caused by the heating device.

2. Description of the Prior Art

There has been known an automotive seat provided with a heating device or heater in order to warm the body of an occupant sitting thereon.

In most cases, as disclosed in the U.S. Pat. No. 4,558,905, or the Swedish Patent Nos. 8305100-3 and 8400387-0, the seat of this kind is so constructed that a heating device is incorporated within a trim cover assembly covering a cushion member.

While warmth is provided to the occupant with such structure satisfactorily, several drawbacks arise therefrom, namely, the hardness of the heating device is felt by the occupant on the seat, resulting in an impairment of the seating comfort of the seat, and a special complicated design and producing process associated therewith are required for arranging and fixedly securing the heating device against its dislocation between a covering member and wadding of the trim cove assembly, which causes an undesirable increase of costs. Further, in those prior arts, the seat is basically composed of an integral trim cover assembly which has been integrally affixed over the surface of a foam cushion member during the foaming process of the latter member, with a view to improving the securing of the trim cover assembly to the foam cushion member (because there is no need to pull down and anchor the trim cover assembly to the cusion member in an old-fashioned well-known manner, as pointed out in the Swedish Patent Nos. 8400387-0 and 8305100-3). But, in the prior art, it is practically impossible to incorporate a heating device therein, because, during the foaming process, the thermal fuse of the heating device is blown out due to a high heat being applied thereto.

SUMMARY OF THE INVENTION

With the above drawbacks in view, it is therefore a first purpose of the present invention to provide an automotive seat with a heating device of the type wherein a trim cover assembly is integrally affixed over a foam cushion member, which is improved in seating touch so that the heating device is not felt by an occupant sitting on the seat and is much simplified in structure.

In accomplishing this purpose, the present invention comprises a cushion member, the rear of which is formed with a recessed portion, a block member removably inserted in such recessed portion, a heating device arranged between the recessed portion of the cushion member and the block member, and a trim cover assembly integrally affixed over the upper surface of the cushion member. Accordingly, since the heating device is disposed within the cushion member, there is eliminated any unpleasing seating touch caused by the heating device per se.

It is another purpose of the present invention to provide accessibility of the heating device for its replacement in the case of trouble with the device.

To this end, as stated above, the block member is inserted in the recessed portion of the cushion member with the heating device disposed therebetween, and therefore, the block member can be removed from the recessed portion, to thereby make accessible the heating device to an occupant for its replacement and also permit a new heating device to be accommodated within the recessed portion. Further, since the cushion and block members are supported on a seat frame or other supportive members, the heating device are also supported in a firm manner.

It is still another purpose of the present invention to offer an improved cushioning property to the seat with heating device.

In attaining this purpose, according to the present invention, the block member is made of a more elastic and softer foam material (an urethane foam, for example) than that of the cushion member, so that the portion of the seat corresponding to the block member is given a more cushiony effect, and as the heating device rests on such block member, the cushioning property is not impaired by the heating device.

It is yet still another purpose of the present invention to provide an improved aesthetic appearance of the seat with the heating device.

In attaining this purpose, the heating device is accommodated in the recessed portion formed at the bottom of the cushion member, whereupon it does not require the sewing of the heating device to the trim cover assembly and thus no seam portion or no aesthetically poor portion appears on the surface of the seat as in the prior arts, and the integral affixing of the trim cover assembly to the cushion member helps to pronounce the outer beauty of the seat. Hence, the presence of the heating device is not observed at all from the seat.

DETAILED DESCRIPTION OF PREFERRED EMBODIMENTS OF THE INVENTION

Figure 1:
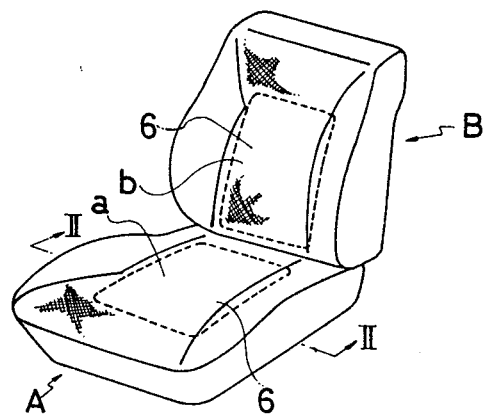
FIG. 1 is a perspective view of an automotive seat with a heating device in accordance with the present invention.

Referring to FIG. 1, illustrated is an automotive seat in accordance with the present invention. Designations (A) and (B) respectively denote a seat cushion and seat back. A heating device (6) is provided within the seat cushion (A) at the buttocks support portion (a) and also provided within the seat back (B) at the back support portion (b), so that each heating device (6) provides the proper temperature of heat to the corresponding body parts of an occupant sitting on the seat.

Figure 2:
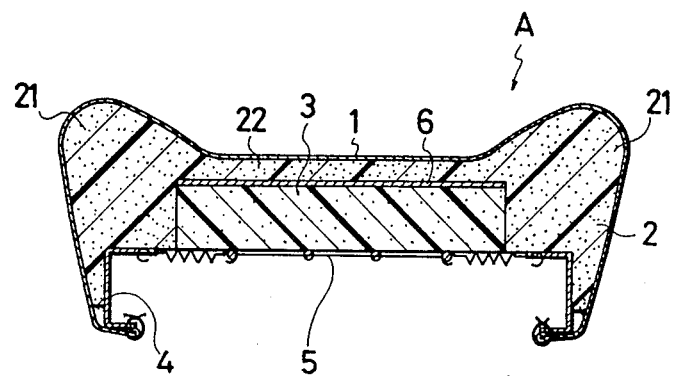
FIG. 2 is a sectional view taken along the line II—II in the FIG. 1.
Figure 3:
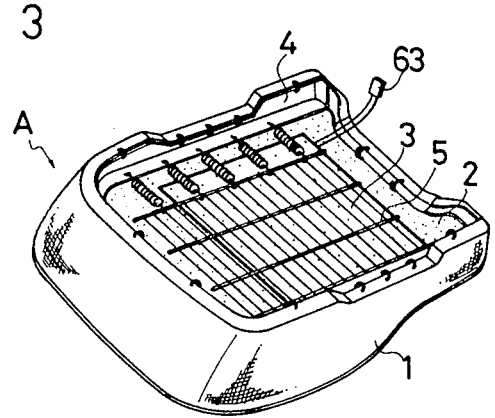
FIG. 3 is a perspective view of the seat, showing its rear side.
Figure 4:
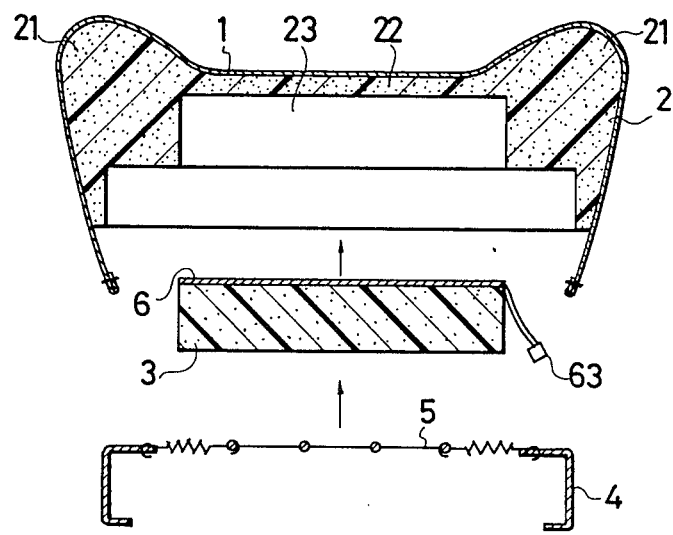
FIG. 4 is an exploded sectional view of the seat, showing explanatorily the construction of principal elements.

With reference to FIGS. 2 through 4, a specific description will be made of the structure of the seat.

The seat cushion (A) includes a cushion member (2) which is formed by foaming in a mold of a proper shape and thus made of a foam material such as urethane foam. Integrally affixed over the cushion member (2), is a trim cover assembly (1). For that purpose, previously, during a foaming process for the cushion member (2), the trim cover assembly (1) was placed in a mold and then foaming material is injecting into the mold and foamed together with the trim cover assembly (1). The cushion member (2), in the illustrated embodiment, has a pair of spaced-apart protruding portions (21) each being formed at the respective lateral sides thereof and a central seating portion (22) formed between the protruding portions (21). At the rear side of the cushion member (2), there is formed a recessed portion (23) at the point substantially corresponding to the central seating portion (22), which recessed portion (23) has also been formed during the foaming process for the cushion member (2) stated above.

It is essential that the cushion member (2) be made of such an urethane foam material having plural open cells therein in order to be provided with an air permeable property. Further the trim cover assembly (1) must be made of an air permeable material such as a woven fabric or a knitted material, for the purpose of letting out heat from the heating device towards the outside of the seat.

Regarding the affixing of the trim cover assembly (1) to the cushion member (2), it is alternatively optional that the trim cover assembly (1) is pressed and bonded by an adhesive to the cushion member (2) subsequent to a foaming process of the cushion member (2), instead of being integrally adhered to the cushion member during its foaming process stated above.

The heating device (6) is a known electric heating element in common use with an automotive seat, mounted on the block member (3) as shown in FIG. 4, and the block member (3) with the heating device (6) is removably inserted in the aforementioned recessed portion (23) formed at the rear of the cushion member (2). The block member is supported on a frame (4) and a spring supportive member (5) is extended in the seat frame (4), and it is seen that both heating device (6) and block member (3) are stably supported against dislocation.

With this structure, when the heating device (6) is switched on, heat emitted therefrom is transmitted through the central seating portion (22) of the cushion member (2) and the trim cover assembly (1) to the buttocks of an occupant thereon, warming the same.

The block member (3) is made of more elastic urethane foam material than that of the cushion member (2). The frame (4) is made of a metallic plate and formed in a suitable rectangular shape to fit the bottom portion of the seat, and the spring supportive member (5) consists of a plurality of coil springs and wire members, which are extended in the frame (4).

FIG. 3 clearly shows the bottom portion of the the seat in which the block member (3) is supportively secured by the frame (4) and spring supportive member (5).

Figure 5:
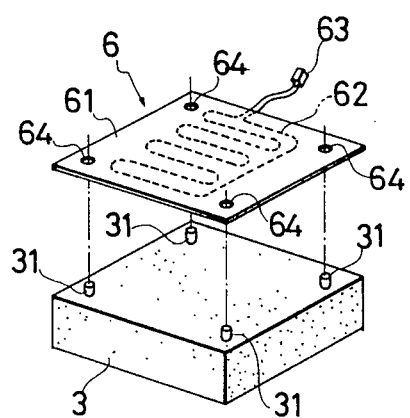
FIG. 5 is a perspective view of a block member and a heating device, showing the state where the heating device is mounted on the block member.

As shown in FIG. 5, the heating device (6) is secured on the block member (3) by means of four projected pieces (31) provided at the corners of the block member (3) and four apertures (64) perforated in the corners of a cover sheet (61) associated with the heating device (6). Specifically, in the present embodiment, the heating device (6) comprises a heating wire (62), a cover sheet (61) covering the heating wire (62) and a lead (63) electrically connected with the heating wire, the lead (63) being in turn electrically connected with a battery (not shown) equipped in an automobile. In the cover sheet (61), there are four apertures perforated at the respective four corners thereof. On the other hand, in the block member (3), four projected pieces (31) are integrally formed at the respective four corners thereof in a manner being alignment with the respective four apertures (64) of the cover sheet (61).

Figure 6:
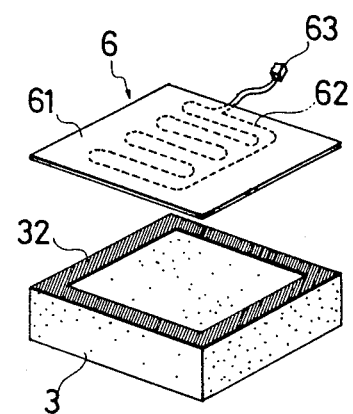
FIG. 6 is a perspective view of another embodiment in which the heating device is secured on the block member.

The manner in which the heating device (6) is secured on the block member (3) is such that the cover sheet (61) is placed on the upper surface of the block member (3) so that the four projected pieces (31) are respectively inserted through the four apertures (64), with care being paid to stretch the cover sheet (61) uniformly without any wavy portions FIG. 6 illustrates another embodiment in which an adhesive or a pressure sensitive adhesive double coated tape (32) is applied on the peripheral portions of the upper surface of the block member (3), so that the cover sheet (61) of the heating device is bonded securely on the block member (3).

With regard to the back support portion (b) of the seat back (B), the similar structure of heating device (6), block member (3) and cushion member (2) as stated above is formed therein.

From the description above, it is to be appreciated that various advantageous aspects of the present invention are found as follows:

(1) Since the block member (3) is removably inserted in the recessed portion (23) of the cushion member (2), it is readily possible to take out the heating device (6) when failure or trouble occurs thereto, and install a new one in the recessed portion (23).

(2) The block member (3) is an independent mass not bonded to the cushion member (2), and may be formed of a more elastic urethane foam material. Thus, both central seating portion (a) of the seat cushion (A) and back support portion (b) of the seat back (B) are more easily compressible than the other surrounding portions and thus given a more cushiony effect.

(3) The central seating portion (a) of the cushion member (2) overlies the heating device (6), which provides a layer preventing an occupant thereon from feeling the presence of the heating device (6).

(4) The trim cover assembly (1) is integrally affixed to the surface of the cushion member (2). Accordingly, there is no need to pull down and anchor the trim cover assembly (1) to the cushion member (2) as in a conventional seat, and it is quite easy to assemble the seat.

(5) Since the heating device (1) is accommodated in the cushion member (3), sewing or other troublesome fixing procedures are not required to fix the heating device (1) to the trim cover assembly and as such no seam portion or no aesthetically deteriorated portions appear on the surface of the seat.

The description above has just been given of preferred embodiments of the present invention, but it should be understood that the invention is not limited to the embodiments illustrated but other replacements, modifications and additions may structurally be possible without departing from the spirit of the appended claims for the invention.

What is claimed is:

1. An automotive seat with a heating device, comprising:
   a foam cushion member;

a recessed portion formed in a bottom of said cushion member;

a foam block member inserted in said recessed portion, said foam block member being formed independently of said cushion member;

a heating device provided on an upper surface of said block member such that said heating device is securely disposed between an inner surface of said recessed portion of said cushion member and said upper surface of said block member;

a frame provided in said seat;

a support means extended in said frame for supporting said foam cushion member and said block member, and a trim cover assembly affixed over an upper surface of said cushion member, such that an end of said trim cover assembly is anchored to said frame;

said heating device includes a cover sheet and a heating element covered with said cover sheet, wherein said sheet has four apertures perforated therein such that said four apertures are respectively disposed at each of four corners of said cover sheet, and wherein said block member is formed at its upper surface with four projected pieces such that said four projected pieces are respectively disposed at each of four corners of said upper surface of said block member, with such arrangement that said four projected pieces are in alignment with the respective said four apertures, whereby said heating device is secured on said upper surface of said block member by inserting said projected pieces through said apertures.

2. The automotive seat according to claim 1, wherein said cushion member has an air permeable property so that a heat generated from said heating device is transmitted to an occupant who sits on said seat.

3. The automotive seat according to claim 1, wherein said heating device is fixed on said upper surface of said block member such that a peripheral portion of said heating device is integrally bonded to a peripheral portion of said upper surface of said block member.

4. The automotive seat according to claim 1, wherein said trim cover assembly is integrally affixed to said cushion member in such a manner that said cushion member is foamed together with said trim cover assembly during a foaming process in which said cushion member is formed by foaming in a mold.

5. The automotive seat according to claim 1, wherein said trim cover assembly is integrally affixed to said cushion member in such a manner that said cushion member is integrally bonded to said trim cover assembly subsequent to a foaming process in which said cushion member is formed by foaming in a mold.

6. The automotive seat according to claim 1, wherein said cushion member has a pair of protrudinng portions formed at its upper surface such that each of said protruding portions is disposed at the respective lateral sides of said cushion member, and a central portion defined between said pair of protruding portions of said cushion member, and wherein said heating device is disposed within said cushion member at a point corresponding to said central portion of said cushion member.

* * * * *